United States Patent
Tokuda et al.

(10) Patent No.: US 12,281,365 B2
(45) Date of Patent: Apr. 22, 2025

(54) METHOD FOR PRODUCING MOLTEN STEEL

(71) Applicant: Kobe Steel, Ltd., Kobe (JP)

(72) Inventors: Koji Tokuda, Kobe (JP); Tsuyoshi Mimura, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 242 days.

(21) Appl. No.: 17/775,502

(22) PCT Filed: Nov. 11, 2020

(86) PCT No.: PCT/JP2020/042005
§ 371 (c)(1),
(2) Date: May 9, 2022

(87) PCT Pub. No.: WO2021/100565
PCT Pub. Date: May 27, 2021

(65) Prior Publication Data
US 2022/0389527 A1 Dec. 8, 2022

(30) Foreign Application Priority Data

Nov. 21, 2019 (JP) .................................. 2019-210829

(51) Int. Cl.
*C21B 11/10* (2006.01)
*C21C 1/00* (2006.01)

(52) U.S. Cl.
CPC ................ *C21B 11/10* (2013.01); *C21C 1/00* (2013.01)

(58) Field of Classification Search
CPC ....... C21B 11/10; C21B 1/00; C21B 2300/02; C21B 13/143; Y02P 10/143; C21C 1/04;
(Continued)

(56) References Cited

U.S. PATENT DOCUMENTS 5,279,639 A * 1/1994 Kemeny ................ C21C 7/076
75/312
6,149,709 A * 11/2000 Uragami ................ C21B 13/14
75/10.63
(Continued)

FOREIGN PATENT DOCUMENTS

| CN | 102399941 A | 4/2012 |
| CN | 107034334 A | 8/2017 |

(Continued)

OTHER PUBLICATIONS

International Search Report issued Dec. 22, 2020 in PCT/JP2020/042005 filed on Nov. 11, 2020, 2 pages.
(Continued)

*Primary Examiner* — Brian D Walck
*Assistant Examiner* — Danielle Carda
(74) *Attorney, Agent, or Firm* — Oblon, McClelland, Maier & Neustadt, L.L.P.

(57) ABSTRACT

A method includes, in a first furnace, melting 40% to 95% by mass of a solid-state direct reduced iron, and separating a molten pig iron having a carbon content of 2.0% to 5.0% by mass and a temperature of 1350 to 1550° C. and a slag having a basicity of 1.0 to 1.4. In a second furnace, a remainder of the solid-state direct reduced iron is melted together with the molten pig iron separated in the first furnace to form a molten material, and oxygen is blown onto the molten material to decarburize into a molten steel. The solid-state direct reduced iron includes 3.0% by mass or more of $SiO_2$ and $Al_2O_3$ in total and 1.0% by mass or more of carbon. A ratio of a metallic iron to a total iron content contained in the solid-state direct reduced iron is 90% by mass or more.

4 Claims, 3 Drawing Sheets

(58) Field of Classification Search
CPC ........... C21C 5/52; C21C 5/5217; C21C 5/54; C21C 7/068; C21C 1/00
USPC .......................................................... 75/582
See application file for complete search history.

(56) References Cited

U.S. PATENT DOCUMENTS

| | | | |
|---|---|---|---|
| 2001/0027701 A1* | 10/2001 | Ito | C21B 13/105 75/484 |
| 2002/0112567 A1 | 8/2002 | Kawakami et al. | |
| 2003/0019329 A1 | 1/2003 | Sugitatsu et al. | |
| 2022/0396844 A1* | 12/2022 | Tokuda | C21C 5/527 |

FOREIGN PATENT DOCUMENTS

| | | |
|---|---|---|
| CN | 109321710 A | 2/2019 |
| JP | 50-134912 A | 10/1975 |
| JP | 1-149916 A | 6/1989 |
| JP | 2000-38612 A | 2/2000 |
| JP | 2001-515138 A | 9/2001 |
| JP | 2001-279315 A | 10/2001 |
| JP | 2003-105415 A | 4/2003 |
| JP | 2017-57431 A | 3/2017 |
| RU | 2 337 971 C1 | 11/2008 |
| WO | WO 2016/202449 | 12/2016 |

OTHER PUBLICATIONS

Atsushi et al., "MIDREX (Registered Trademark) Processes", R&D Kobe Steel Technical Report, vol. 60, No. 1, Apr. 2010, pp. 5-11 (with partial unedited computer-generated English translation).
Extended European Search Report issued Oct. 20, 2022, in corresponding European Patent Application No. 20889204.2, 7 pages.
Tekko Binran vol. II—Seisen, Seiko (Handbook of Iron and Steel vol. II—Pig Iron Making, Steelmaking), 3rd edition, The Iron and Steel Institute of Japan, Oct. 15, 1979, (with partial English translation), 4 pages.
Kekkonen et al., Technical Report: Comparison of Different Coal Based Direct Reduction Processes, Aug. 2000, 47 pgs.
Sonderdruck aus Zement-Kalk-Gips, Zurn Einfluβ der Chemie des Htittensands auf die Festigkeiten von Hochofenzementen, with partial English translation, 5 pages.
Use of Hot Briquetted Iron (HBI) in the Electric Arc Furnace (EAF) for Steelmaking, IIMA Face Sheet #2 (2017), 2 pages.
The Use of Hot Briquetted Iron (HBI) in the Basic Oxygen Furnace (BOF) for Steelmaking, IIMA Fact Sheet #3 (2017), 2 pages.

* cited by examiner

METHOD FOR PRODUCING MOLTEN STEEL

TECHNICAL FIELD

The present invention relates to a method for producing a molten steel.

BACKGROUND ART

A direct iron production method has been carried out in which an iron oxide source such as iron ore is reduced in a solid state with a carbonaceous material or a reducing gas to obtain direct reduced iron. A method of obtaining a molten steel by reducing an iron ore with a natural gas and melting the obtained direct reduced iron in an electric furnace is disclosed in Non-Patent Literature 1.

In recent years, production of so-called high-grade iron ore with a low content of impurities such as gangue has decreased, so importance of a low-grade iron ore has been increasing.

However, direct reduced iron obtained from a low-grade iron ore as a raw material contains a relatively large amount of gangue, so that when gangue is melted in an electric furnace, a large amount of slag is generated along with a molten steel.

Since the iron content of slag generated together with the molten steel is as high as about 25% by mass, the greater the amount of slag, the more iron contained in the slag, and the yield of the molten steel drops significantly. Therefore, although a low-grade iron ore has a lower price per unit weight than a high-grade iron ore, the weight of iron ore required to produce a unit-weight molten steel in the low-grade iron ore is significantly higher compared to the high-grade iron ore, and the production cost of the molten steel by unit weight in the low-grade iron ore is not much different from that of the high-grade iron ore.

As described above, the use of a low-grade iron ore as a raw material for direct reduced iron is currently limited because there is no significant cost advantage due to the low yield.

The present invention has been made in view of such a problem, and an object thereof is to provide a method for producing a molten steel capable of being obtained in a high yield even when a low-grade iron ore is used as a raw material for solid-state direct reduced iron.

CITATION LIST

Non-Patent Literature

Non-Patent Literature 1: Masaaki ATSUSHI, Hiroshi UEMURA, Takashi SAKAGUCHI, "MIDREX (Registered Trademark) Processes", R&D Kobe Steel Technical Report, Vol. 60, No. 1, April 2010, pp. 5-11

SUMMARY OF INVENTION

As a result of various studies, the present inventors have found that the above object can be achieved by the following inventions.

A method for producing a molten steel according to one aspect of the present invention is a method for producing a molten steel using a solid-state direct reduced iron as a raw material, in which the solid-state direct reduced iron contains 3.0% by mass or more of $SiO_2$ and $Al_2O_3$ in total and 1.0% by mass or more of carbon, a ratio of a metallic iron to the total iron content contained in the solid-state direct reduced iron is 90% by mass or more, and an excess carbon content Cx specified by the following formula (1) to the carbons contained in the solid-state direct reduced iron is 0.2% by mass or more, the method including a step in a first furnace of melting 40 to 100% by mass of the solid-state direct reduced iron, and separating a molten pig iron having a carbon content of 2.0 to 5.0% by mass and a temperature of 1350 to 1550° C. and a slag having a basicity of 1.0 to 1.4 and a step in a second furnace of melting a remainder of the solid-state direct reduced iron together with the molten pig iron separated in the first furnace, and blowing oxygen onto the molten material to decarburize into a molten steel.

$$Cx=[C]-[FeO]\times12\div(55.85\pm16)\div0.947 \quad (1)$$

In the formula, Cx: excess carbon content (% by mass), [C]: carbon content of solid-state direct reduced iron (% by mass), [FeO]: FeO content of solid-state direct reduced iron (% by mass).

The object, feature and advantage of the present invention will be clarified from the following detailed description and attached drawings.

DESCRIPTION OF EMBODIMENT

Hereinafter, a method for producing a molten steel according to an embodiment of the present invention will be specifically described, but the present invention is not limited thereto.

[Method for Producing Molten Steel]

A method for producing a molten steel according to the present embodiment is a method for producing a molten steel using a solid-state direct reduced iron as a raw material, in which the solid-state direct reduced iron contains 3.0% by mass or more of $SiO_2$ and $Al_2O_3$ in total and 1.0% by mass or more of carbon, a ratio of a metallic iron to the total iron content contained in the solid-state direct reduced iron is 90% by mass or more, and an excess carbon content Cx specified by the following formula (1) to the carbons contained in the solid-state direct reduced iron is 0.2% by mass or more.

$$Cx=[C]-[FeO]\times12\div(55.85\pm16)\div0.947 \quad (1)$$

In the formula, Cx: excess carbon content (% by mass), [C]: carbon content of solid-state direct reduced iron (% by mass), [FeO]: FeO content of solid-state direct reduced iron (% by mass).

According to the above configuration, it is possible to provide a method for producing a molten steel with a high yield even if a low-grade iron ore is used as a raw material for a solid-state direct reduced iron.

Figure 1:
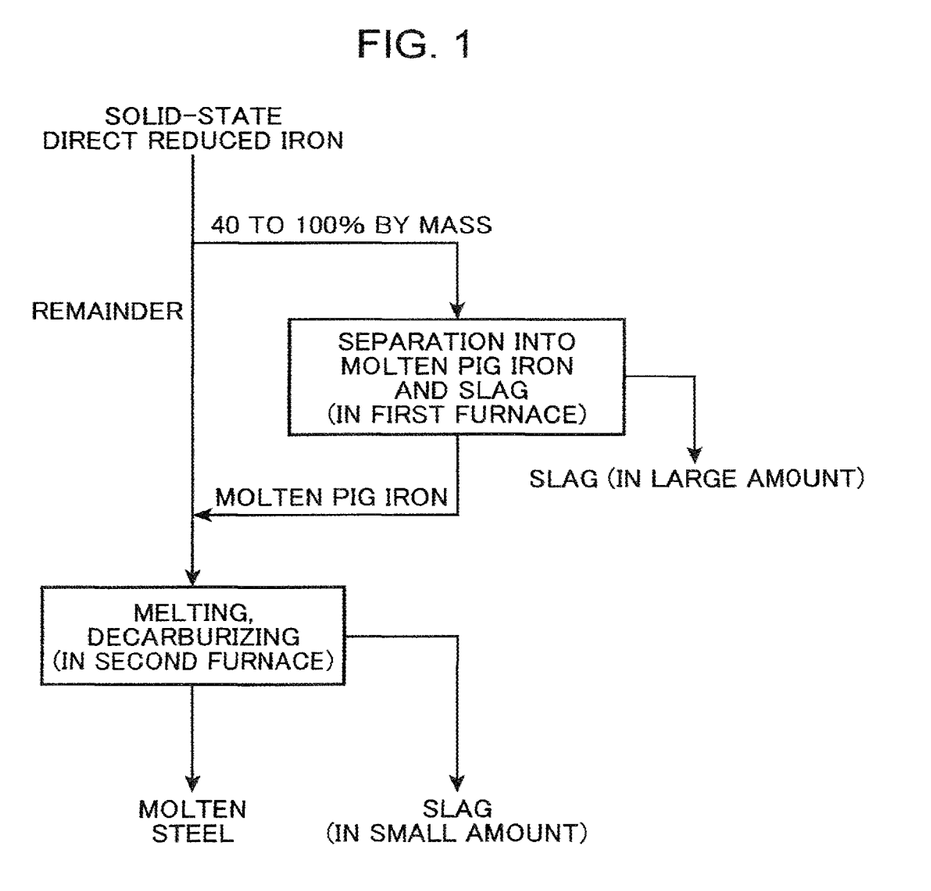
FIG. 1 is a flowchart of a method for producing a molten steel according to an embodiment of the present invention.

Further, the method for producing a molten steel according to the present embodiment, as shown in the flowchart of FIG. 1, includes a step in a first furnace of melting 40 to 100% by mass of a solid-state direct reduced iron, and separating a molten pig iron having a carbon content of 2.0 to 5.0% by mass and a temperature of 1350 to 1550° C. and a slag having a basicity of 1.0 to 1.4 (hereinafter, referred to as "step in the first furnace") and a step in a second furnace of melting a remainder of the solid-state direct reduced iron together with the molten pig iron separated in the first furnace, and blowing oxygen onto the molten material to decarburize into a molten steel (hereinafter, referred to as "step in the second furnace").

In the following, each requirement of the method for producing a molten steel according to the present embodiment will be described.

(Solid-State Direct Reduced Iron)

In the method for producing a molten steel according to the present embodiment, a solid-state direct reduced iron having a total content of $SiO_2$ and $Al_2O_3$ of 3.0% by mass or more is used. As the solid-state direct reduced iron, for example, iron oxide sources such as iron ore, which are reduced in a solid state with a carbonaceous material or a reducing gas, can be used. There are no particular restrictions on the method for producing a solid-state direct reduced iron, and production methods using known direct reduced iron production plants such as rotary hearth furnaces, movable hearth type reduction furnaces such as straight grate, vertical furnaces such as shaft furnaces, and rotary furnaces such as rotary kilns can be applied.

When the total content of $SiO_2$ and $Al_2O_3$ of the solid-state direct reduced iron is less than 3.0% by mass, the grade of the iron oxide source such as iron ore used for producing the solid-state direct reduced iron is high. Even if such solid-state direct reduced iron is directly melted in the second furnace, the amount of the slag generated as a by-product is small, so that a molten steel can be obtained with a high yield. As a result, when the total content of $SiO_2$ and $Al_2O_3$ of the solid-state direct reduced iron is less than 3.0% by mass, it is not necessary to apply the method for producing a molten steel according to the present embodiment in which the solid-state direct reduced iron is made into a molten pig iron in the first furnace prior to the second furnace. Therefore, in the method for producing a molten steel according to the present embodiment, a solid-state direct reduced iron having a total content of $SiO_2$ and $Al_2O_3$ of 3.0% by mass or more is used.

The carbon content of the solid-state direct reduced iron is set to 1.0% by mass or more. When the solid-state direct reduced iron is melted in the first furnace, FeO in the solid-state direct reduced iron is reduced by the carbon contained in the solid-state direct reduced iron, thereby to generate CO gas. By setting the carbon content of the solid-state direct reduced iron to 1.0% by mass or more, a sufficient volume of CO gas can be generated, and thus a sufficient slag foaming can be achieved by the generated CO gas. Efficient heating becomes possible by performing an arc heating in this foamed slag. From this viewpoint, the carbon content of the solid-state direct reduced iron is preferably 1.5% by mass or more.

On the other hand, if the carbon content of the solid-state direct reduced iron is excessive, the carbon concentration of the molten pig iron may exceed a saturated carbon concentration. When the carbon concentration of the molten pig iron exceeds the saturated carbon concentration, the carbon that did not contribute to the reduction reaction of FeO is discharged to the outside of the furnace together with the slag or exhaust gas to be wasted. Therefore, the carbon content of the solid-state direct reduced iron is preferably 7.0% by mass or less, and more preferably 6.0% by mass or less.

A ratio of a metallic iron to the total iron content contained in the solid-state direct reduced iron (hereinafter, also referred to as "metallization rate of solid-state direct reduced iron" or simply "metallization rate") is set to 90% by mass or more. By setting the metallization rate of the solid-stale direct reduced iron to 90% by mass or more, a molten steel can be produced with a high yield by the method for producing a molten steel according to the present embodiment.

When the metallization rate of the solid-state direct reduced iron is less than 90% by mass, the FeO content in the solid-state direct reduced iron increases. The carbon content of the solid-state direct reduced iron can be increased in a carburizing process performed during the production of the solid-state direct reduced iron. However, there is an upper limit to the carbon content of the solid-state direct reduced iron that is industrially feasible. Therefore, when the content of FeO in the solid-state direct reduced iron is high, FeO that is not reduced by the carbon contained in the solid-state direct reduced iron remains in the first furnace. The unreduced FeO elutes into a slag as it is and is discharged from the first furnace together with the slag. As described above, when the metallization rate of the solid-state direct reduced iron is less than 90% by mass, it is difficult to produce a molten steel with a high yield even if the step in the first furnace and the step in the second furnace according to the present embodiment are applied. Therefore, in the method for producing a molten steel according to the present embodiment, the metallization rate of the solid-state direct reduced iron is set to 90% by mass or more. Further, when the FeO content in the solid-state direct reduced iron is high, the energy required for reducing FeO in the step in the first furnace and the step in the second furnace also increases. Therefore, the metallization rate of the solid-state direct reduced iron is more preferably 92% by mass or more. The higher the metallization rate is, the more preferable the metallization rate becomes, so there is no particular upper limit. However, since an excessively high metallization rate greatly reduces the productivity of the solid-state direct reduced iron in a production process for solid-state direct reduced iron, the metallization rate is preferably 98% by mass or less, more preferably 97% by mass or less.

Of the carbon contained in the solid-state direct reduced iron, the excess carbon content Cx specified by the above formula (1) is set to 0.2% by mass or more. The excess carbon content Cx is an amount of carbon remaining (hereinafter, also referred to as "excess carbon") when all FeO contained in the solid-state direct reduced iron is reduced with the carbon contained in the solid-state direct reduced iron. By setting the excess carbon content Cx to 0.2% by mass or more, when the solid-state direct reduced iron is melted in the first furnace, all FeO contained in the solid-state direct reduced iron is reduced by the carbon contained in the solid-state direct reduced iron. Therefore, the elution of FeO contained in the solid-state direct reduced iron into the slag can be suppressed.

Furthermore, since the carbon content in the molten iron can be increased by the excess carbon, it is possible to reduce the proportion of exterior carburizing required to obtain a molten pig iron with a carbon content of 2.0 to 5.0% by mass. Here, "exterior carburizing" means charging carbon into a furnace together with a solid-state direct reduced iron. On the other hand, "interior carburizing" means that the solid-state direct reduced iron is made to contain carbon.

Such interior carburizing is performed, for example, in the production of the solid-state direct reduced iron. Since the exterior carburizing is inferior to the interior carburizing in carburizing efficiency, the carburizing efficiency can be improved as a whole by setting the excess carbon content Cx to 0.2% by mass or more. Here, the "carburizing efficiency" means the ratio of carbon dissolved in the molten pig iron to the carbons charged into the furnace by the exterior carburizing or the interior carburizing.

The excess carbon content Cx is preferably 0.2% by mass or more, and more preferably 0.5% by mass or more. If the excess carbon content Cx is excessive, the carbon concentration of the molten pig iron may exceed the saturated carbon concentration. When the carbon concentration of the molten pig iron exceeds the saturated carbon concentration, as described above, the carbon that did not contribute to the reduction reaction of FeO is discharged to the outside of the furnace together with the slag or the exhaust gas to be wasted. Therefore, the excess carbon content Cx is preferably 6.0% by mass or less, and more preferably 5.0% by mass or less.

Next, each step of the method for producing a molten steel according to the present embodiment will be described.

(Step in First Furnace)

In the first furnace, 40 to 100% by mass of the solid-state direct reduced iron, which is a raw material for a molten steel, is melted. The proportion of the solid-state direct reduced iron to be melted in the first furnace can be determined depending on, for example, the total content of $SiO_2$ and $Al_2O_3$ contained in the solid-state direct reduced iron, the target slag amount to be produced from the remainder of the solid-state direct reduced iron in the second furnace, and the like. It is preferable that the higher the total content of $SiO_2$ and $Al_2O_3$, the higher the proportion of the solid-state direct reduced iron melted in the first furnace. This is because the higher the proportion of the solid-state direct reduced iron melted in the first furnace, the smaller the amount of slag generated in the second furnace, so that the yield of the molten steel can be higher. On the other hand, if the proportion of the solid-state direct reduced iron melted in the first furnace is increased more than necessary, the amount of electric power used per 1 ton of the molten steel combined in the step in the first furnace and the step in the second furnace increases. Therefore, the proportion of the solid-state direct reduced iron to be melted in the first furnace is preferably 45% by mass or more, and more preferably 50% by mass or more. The proportion of the solid-state direct reduced iron to be melted in the first furnace is preferably 95% by mass or less, more preferably 90% by mass or less.

For the first furnace, for example, an electric ironmaking furnace described later can be used.

The solid-state direct reduced iron is charged into the first furnace and heated, and slag-making materials such as quicklime and dolomite are added as necessary according to the total content of $SiO_2$ and $Al_2O_3$ of the solid-state direct reduced iron. In addition, exterior carburizing as necessary according to the carbon content of the solid-state direct reduced iron, followed by melting is performed. By these process, a molten pig iron having a carbon content of 2.0 to 5.0% by mass and a temperature of 1350 to 1550° C. and a slag having a basicity of 1.0 to 1.4 are separated. For reducing the energy required for heating, the solid-state direct reduced iron charged into the first furnace is preferably in a state before the temperature drops after its production.

Figure 2:
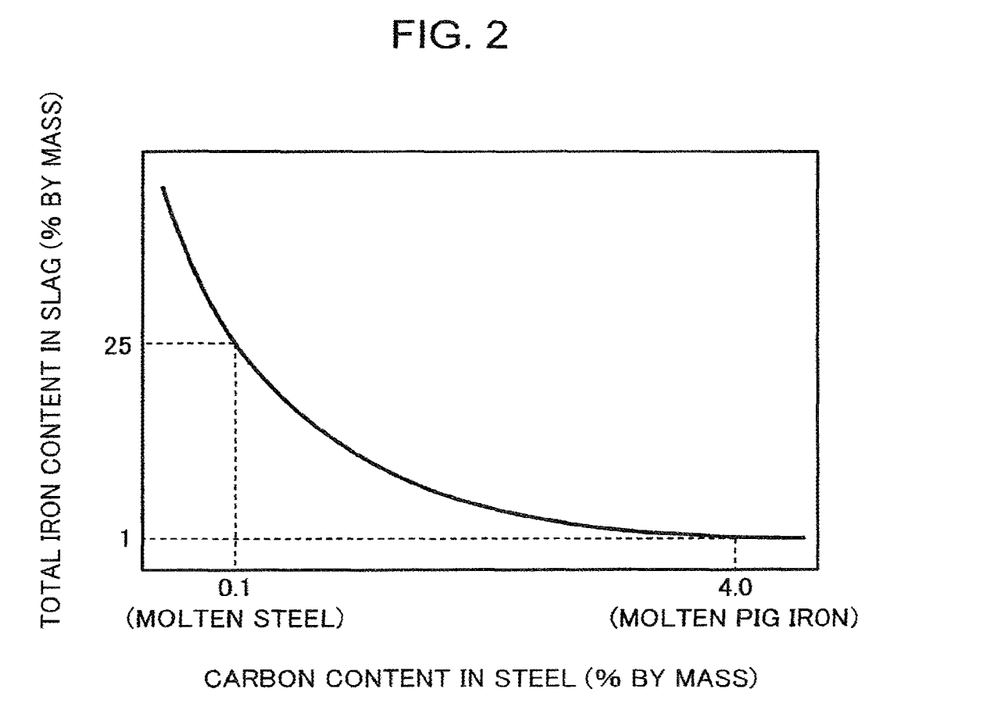
FIG. 2 is a graph showing an example of a relationship between an amount of carbon contained in a molten iron and an amount of total iron that can be contained in a slag coexisting with the molten iron.

FIG. 2 is a graph showing an example of a relationship between an amount of carbon contained in the molten iron and an amount of total iron that can be contained in the slag coexisting with the molten iron. As shown in FIG. 2, in general, the greater the amount of carbon contained in the molten iron, the smaller the amount of total iron that can be contained in the slag. That is, the molten pig iron having a relatively high carbon content is contained in a smaller amount in the slag than the molten steel having a relatively low carbon content. In the present embodiment, the molten pig iron refers to a molten iron having a carbon content of 2.0% by mass or more, and the molten steel refers to a molten iron having a carbon content of less than 2.0% by mass.

In the step in the first furnace according to the present embodiment, the carbon content of the molten pig iron is set to 2.0 to 5.0% by mass. As a result, the amount of total iron that can be contained in the slag can be reduced, and the amount of iron that is transferred to the slag can be reduced. Therefore, the amount of total iron discharged together with the slag can be reduced, and the decrease in the yield of the molten pig iron can be suppressed. Further, as a result, it is possible to suppress a decrease in the yield of the molten steel obtained in the second furnace. The carbon content of the molten pig iron is preferably 3.0% by mass or more.

In the first furnace, the temperature of the molten pig iron is set to 1350 to 1550° C. As a result, the carbon contained in the molten iron can be dissolved to bring the carbon content of the molten pig iron to 2.0 to 5.0% by mass. By setting the temperature of the molten pig iron to 1350° C. or higher, the viscosity of the slag is lowered, so that the molten pig iron and the slag can be easily separated, and each of the molten pig iron and the slag can be easily discharged from the first furnace. On the other hand, by setting the temperature of the molten pig iron to 1550° C. or lower, it is possible to suppress the erosion of the refractory lining of the first furnace. The temperature of the molten pig iron is preferably 1400° C. or higher. In addition, the temperature of the molten pig iron is preferably 1530° C. or lower.

The basicity of the slag is set to 1.0 to 1.4. By setting the basicity of the slag to 1.4 or less, the fluidity of the slag can be ensured, and the slag can be easily discharged from the first furnace. Further, when a basic refractory is used as a refractory lining of the first furnace, the erosion of the refractory due to the slag can be suppressed by setting the basicity of the slag to 1.0 or more. Here, the basicity of the slag means a mass ratio of CaO to $SiO_2$ ($CaO/SiO_2$) with respect to CaO and $SiO_2$ contained in the slag. The basicity of the slag can be adjusted by adjusting the amount of a slag-making material to be charged into the first furnace together with the solid-state direct reduced iron.

(Step in Second Furnace)

In the second furnace, the remainder of the solid-state direct reduced iron is melted together with the molten pig iron separated in the first furnace, and oxygen is blown onto the molten material to decarburize into a molten steel. Since 40 to 100% by mass of the solid-state direct reduced iron is to be melted in the first furnace, the remainder of the solid-state direct reduced iron to be melted in the second furnace is 0 to 60% by mass. That is, when the total amount of the solid-state direct reduced iron (100% by mass) is melted in the first furnace, there is no solid-state direct reduced iron (0% by mass) to be melted in the second furnace.

As the second furnace, a general electric arc furnace (EAF) that generates arc plasma to perform heating can be used. The molten pig iron obtained in the first furnace is poured into the second furnace, the remainder of the solid-state direct reduced iron is charged thereinto, and then the molten pig iron and the solid-state direct reduced iron are heated and melted. At this time, based on the composition of the solid-state direct reduced iron and the like, a slag-making material such as quicklime and dolomite may be appropriately added to the molten material as necessary.

The molten material housed in the second furnace contains a molten pig iron increased by melting the solid-state direct reduced iron and a slag generated from $SiO_2$, $Al_2O_3$, etc. contained in the solid-state direct reduced iron. Oxygen is blown from the upper surface of the molten material or from the lower part of the furnace to oxidize the carbon contained in the molten pig iron and remove the carbon as carbon monoxide. As a result, a molten steel can be obtained. Further, if necessary, the composition of the slag may be adjusted with a slag-making material to transfer impurities contained in the molten pig iron to the slag, so that the impurity content of the molten steel may be adjusted to a desired value.

The basicity of the slag in the second furnace is not particularly limited, but when a basic refractory is used in the portion of the second furnace in contact with the slag, the basicity of the slag is preferably high, for example 1.8, in order to suppress the erosion of the basic refractory.

Further, the amount of carbon contained in the molten steel after decarburization may be adjusted to a desired value according to the use of a steel obtained by solidifying the molten steel.

In addition, iron scrap may be charged into the second furnace in addition to the molten pig iron obtained in the first furnace and the remainder of the solid-state direct reduced iron. Moreover, the whole amount of the molten pig iron obtained in the first furnace may be poured into the second furnace as it is. A part of the molten pig iron obtained in the first furnace is cooled and cast into a pig iron, and the pig iron is added to the molten pig iron obtained in the first furnace and the remainder of the solid-state direct reduced iron and then charged into the second furnace. Further, the pig iron may be sold outside as a raw material for a steelmaking furnace.

According to the method for producing a molten iron according to the present embodiment, as described above, the decrease in the yield of a molten pig iron can be suppressed in the first furnace, and the molten steel can be obtained from the molten pig iron in the second furnace, so that such a molten steel can be obtained with a high yield even if a low-grade iron ore is used as a raw material for the solid-state direct reduced iron.

(When Entire Amount of Solid-State Direct Reduced Iron is Melted in First Furnace)

As described above, when the entire amount of the solid-state direct reduced iron (100% by mass) is melted in the first furnace, there is no solid-state direct reduced iron (0% by mass) to be melted directly in the second furnace without going through the first furnace. Therefore, in the second furnace, only the molten pig iron separated in the first furnace is decarburized. In this case, since the molten pig iron is not cooled by the solid-state direct reduced iron and heating of the molten pig iron is not necessary, a converter may be used as the second furnace. This makes it possible to reduce the energy required to produce the molten steel in the second furnace. When a converter is used, a slag-making material is charged into the converter together with the molten pig iron as necessary, and oxygen is blown onto the molten pig iron from at least one of the upper and lower sides to decarburize the molten pig iron.

[Electric Ironmaking Furnace]

Next, an electric ironmaking furnace (EIF) that can be used as the first furnace in the method for producing a molten steel of the present embodiment will be described.

Figure 3:
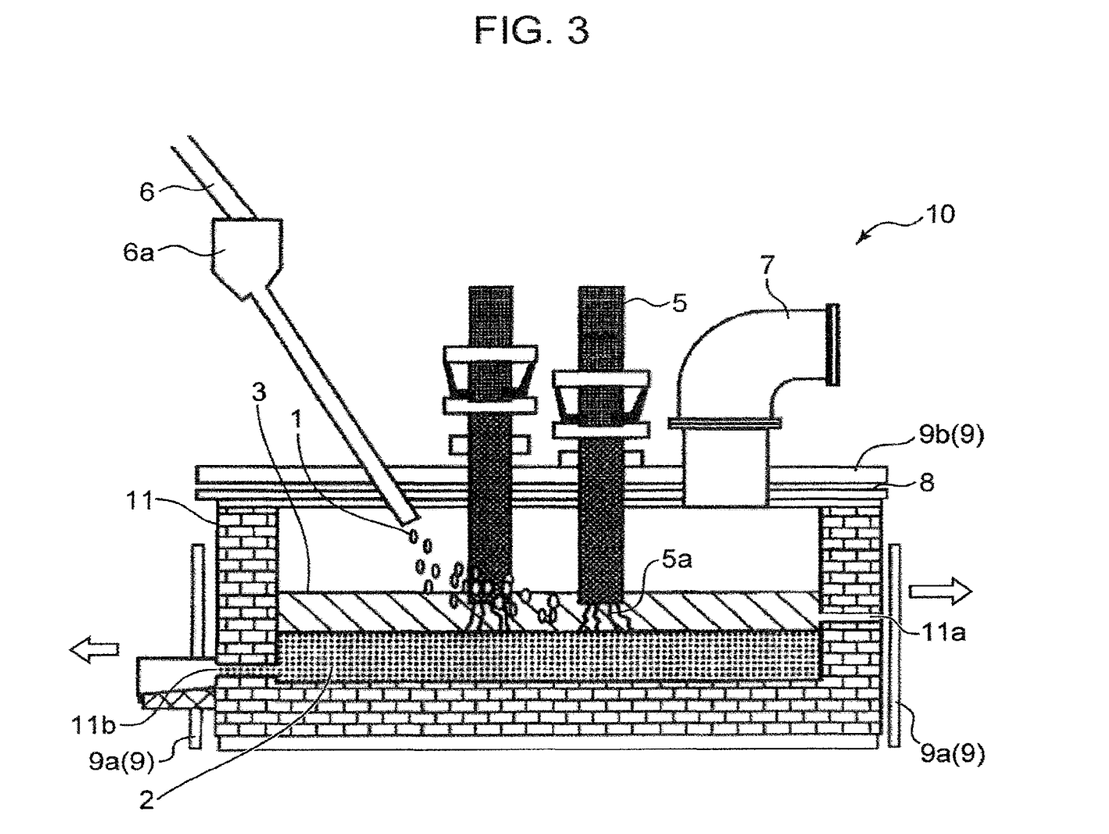
FIG. 3 is a vertical sectional view of an electric ironmaking furnace that can be used in the method for producing a molten steel according to an embodiment of the present invention.

FIG. 3 is a vertical cross-sectional view of an electric ironmaking furnace. An electric ironmaking furnace 10 is a stationary non-tilting type melting furnace that melts a solid-state direct reduced iron by arc heating mainly composed of radiant heat. Hereinafter, the reference numerals described in the drawings indicate 1: solid-state direct reduced iron, 2: molten pig iron, 3: slag, and 5a: arc.

The electric ironmaking furnace 10 has a main body 11 that houses a solid-state direct reduced iron 1, a molten pig iron 2 and a slag 3; an electrode 5 provided on the upper part of the main body 11 for heating the solid-state direct reduced iron 1, molten pig iron 2 and slag 3 housed in the main body 11 by an arc 5a; a charging part 6 for charging the solid-state direct reduced iron 1 into the main body 11; an exhaust part 7 for discharging gas and dust generated by heating the solid-state direct reduced iron 1, the molten pig iron 2 and the slag 3; a lid part 8 that covers the main body 11 from above; and a cooling part 9 that cools the main body 11. The lid part 8 is provided with a through hole through which the electrode 5, the charging part 6 and the exhaust part 7 penetrate. Further, the main body 11 is provided with a slag exit hole 11a for discharging the slag 3 and a taphole 11b provided below the slag exit hole 11a for discharging the molten pig iron 2 in such a manner to respectively penetrate the wall. The slag exit hole 11a and the taphole 11b can be closed by a mud gun and opened by a drill.

The cooling part 9 has a first cooling member 9a provided for surrounding the outer periphery of the main body 11 and a second cooling member 9b provided above the lid part 8. The first cooling member 9a and the second cooling member 9b each have a water-cooling structure and cool the main body 11 and the lid part 8. The first cooling member 9a and the second cooling member 9b may have an air-cooling structure. By providing the cooling part 9, the main body 11 can be cooled, and the erosion of the refractory material constituting the main body 11 can be suppressed.

The electric ironmaking furnace 10 has a closed structure that can maintain the inside of the furnace in a predetermined atmosphere. Therefore, the parts that may reduce the airtightness in the furnace, such as connection parts between the lid part 8 and the upper end of the main body 11 and parts that come into contact with the electrode 5 and the exhaust part 7 of the lid part 8, are sealed by a known technique such as nitrogen seal or ceramic seal ring. Further, a sealed part 6a combining a material seal by a hopper and a feeder for discharging the solid-state direct reduced iron 1 from the hopper is provided between the charging part 6 and the lid part 8. The structure of the sealed part 6a is not limited to this.

Next, a method for producing the molten pig iron 2 using the electric ironmaking furnace 10 will be described. The solid-state direct reduced iron 1 and, if necessary, a slag-making material such as quicklime and dolomite and an exterior carburizing material are charged into the main body 11 via the charging part 6. After that, the electrode 5 is energized, and the solid-state direct reduced iron 1 is heated by the arc 5a generated from the tip of the electrode 5. As the temperature of the solid-state direct reduced iron 1 rises, iron oxide (Fee) contained in the solid-state direct reduced iron 1 is first reduced by the carbon contained in the solid-state direct reduced iron 1. At this time, carbon monoxide is generated, and the atmosphere inside the main body 11 becomes a reducing atmosphere mainly composed of carbon monoxide. Next, a metallic iron contained in the solid-state direct reduced iron is melted, and the carbon contained in the solid-state direct reduced iron 1 is dissolved in the molten metallic iron, so that the carbon content in the metallic iron is increased to produce the molten pig iron 2. Further, $SiO_2$ and $Al_2O_3$ contained in the solid-state direct reduced iron are melted to form the slag 3 as a by-product, which floats on the molten pig iron 2. After the slag 3 is produced, the tip of the electrode 5 is arranged inside the slag 3 to generate the arc 5a inside the slag 3.

While the electrode 5 is energized, the solid-state direct reduced iron 1, the slag-making material, and the exterior carburizing material are continuously charged into the main body 11, and the amounts of the molten pig iron 2 and the slag 3 gradually increase to raise the liquid level. When the liquid level of the molten pig iron 2 reaches a predetermined height below the slag exit hole 11a, or when the liquid level of the slag 3 reaches a predetermined height above the slag exit hole 11a, the slag exit hole 11a is opened to start discharging the slag 3, and the height of the liquid level of the slag 3 is adjusted. The liquid level of the slag 3 is maintained above the upper end of the slag exit hole 11a so that the atmosphere inside the main body 11 is maintained. Further, the thickness of the slag 3 is maintained at least equal to or larger than a predetermined thickness so that the arc 5a can be generated in the slag 3. As a result, the slag 3 can be continuously discharged from the main body 11 while the solid-state direct reduced iron 1 is continuously charged into the main body 11.

When the liquid level of the slag 3 drops to the upper end of the slag exit hole 11a or when the thickness of the slag 3 reaches the above-mentioned predetermined thickness, the slag exit hole 11a is closed, and when the liquid level of the molten pig iron 2 reaches a predetermined height below the slag exit hole 11a or when the liquid level of the slag 3 reaches a predetermined height above the slag exit hole 11a, the slag exit hole 11a is opened again. It is to be noted that the height of the liquid level of the molten pig iron 2 and the thickness of the slag 3 are estimated from the amount of the solid-state direct reduced iron 1 charged into the main body 11.

Further, when the liquid level of the molten pig iron 2 reaches a predetermined height above the taphole 11b, the discharge of the molten pig iron 2 is started and the height of the liquid level of the molten pig iron 2 is adjusted. The liquid level of the molten pig iron 2 is maintained above the taphole 11b so that the slag 3 is not discharged together with the molten pig iron 2. As a result, the molten pig iron 2 can be continuously discharged from the main body 11 while the solid-state direct reduced iron 1 is continuously charged into the main body 11.

When the liquid level of the molten pig iron 2 drops to the upper end of the taphole 11b, the taphole 11b is closed, and when the liquid level of the molten pig iron 2 reaches a predetermined height or when the liquid level of the slag 3 reaches a predetermined height above the slag exit hole 11a, the taphole 11b is opened again.

As described above, by using the above-mentioned electric ironmaking furnace as the first furnace in the method for producing a molten steel according to the present embodiment, a pig iron can be continuously produced from the solid-state direct reduced iron and can be efficiently produced, so that a molten steel can be produced efficiently as a whole.

The present specification discloses various aspects of techniques as described above, and the main techniques are summarized below.

As described above, the method for producing a molten steel according to one aspect of the present invention is a method for producing a molten steel using a solid-state direct reduced iron as a raw material, in which the solid-state direct reduced iron contains 3.0% by mass or more of $SiO_2$ and $Al_2O_3$ in total and 1.0% by mass or more of carbon, a ratio of a metallic iron to the total iron content contained in the solid-state direct reduced iron is 90% by mass or more, and an excess carbon content Cx specified by the following formula (1) to the carbons contained in the solid-state direct reduced iron is 0.2% by mass or more, the method including a step in the first furnace of melting 40 to 100% by mass of the solid-state direct reduced iron, and separating a molten pig iron having a carbon content of 2.0 to 5.0% by mass and a temperature of 1350 to 1550° C. and a slag having a basicity of 1.0 to 1.4 and a step in the second furnace of melting a remainder of the solid-state direct reduced iron together with the molten pig iron separated in the first furnace, and blowing oxygen onto the molten material to decarburize into a molten steel.

$$Cx=[C]-[FeO]\times12\div(55.85+16)\div0.947 \qquad (1)$$

In the formula, Cx: excess carbon content (% by mass), [C]: carbon content of solid-state direct reduced iron (% by mass), [FeO]: FeO content of solid-state direct reduced iron (% by mass).

According to this configuration, the amount of total iron that can be contained in the separated slag can be reduced in the first furnace, and the amount of total iron that is discharged together with the slag can be reduced. Therefore, a decrease in the yield of the molten pig iron can be suppressed in the first furnace, and the molten steel can be obtained from the molten pig iron in the second furnace. Thus, even if a low-grade iron ore is used as a raw material for the solid-state direct reduced iron, a molten steel can be obtained in a high yield.

In the first furnace having the above configuration, the solid-state direct reduced iron may be melted by an arc, and the molten pig iron and the slag may be continuously discharged respectively from the first furnace.

As a result, the molten pig iron can be efficiently produced in the first furnace, so that the molten steel can be efficiently produced by the molten steel production method as a whole.

Hereinafter, the present invention will be described more specifically with reference to Examples. The following examples are not construed to limit the scope of the invention, and the present invention can be implemented with modifications being added within a scope adaptable to the purposes described above and below, and any of them is to be included within the technical range of the present invention.

EXAMPLES (Test Conditions)

Computer simulation was performed regarding the production of molten steel of the following test numbers 1 to 3 using the electric ironmaking furnace (first furnace) and the electric arc furnace (second furnace) described above and using solid-state direct reduced irons each having the composition shown in Table 1 as a raw material. Solid-state direct reduced iron A1 was produced from a low-grade iron ore as a raw material and had a total content of $SiO_2$ and $Al_2O_3$ of 7.63% by mass. Solid-state direct reduced iron A2 was produced from a high-grade iron ore as a raw material and had a total content of $SiO_2$ and $Al_2O_3$ of 2.47% by mass. The metallization rate was 94.0% in each case. "T.Fe"

shown in Table 1 means a total iron content contained in the solid-state direct reduced iron.

TABLE 1

| Solid-state direct reduced iron | Component composition (% by mass) | | | | | | SiO$_2$ + Al$_2$O$_3$ | Metallization rate (%) |
|---|---|---|---|---|---|---|---|---|
| | T. Fe | SiO$_2$ | Al$_2$O$_3$ | CaO | MgO | C | | |
| A1 | 88.3 | 7.63 | 0.00 | 0.47 | 0.51 | 1.5 | 7.63 | 94.0 |
| A2 | 93.1 | 1.72 | 0.75 | 0.89 | 0.34 | 1.5 | 2.47 | 94.0 |

(Test 1)

Test 1 is an example of the present invention. In Test 1, the test was carried out using a solid-state direct reduced iron A1. In the first furnace, 70% by mass of the solid-state direct reduced iron was made into a molten pig iron. In the second furnace, the remainder of the solid-state direct reduced iron was melted together with the molten pig iron obtained in the first furnace and then decarburized to obtain a molten steel.

In the first furnace, solid-state direct reduced iron at 500° C. was charged into an electric ironmaking furnace, and the carbon content of the molten pig iron was set to 3.0% by mass. In the second furnace, solid-state direct reduced iron at 25° C. was charged into an electric arc furnace, and the carbon content of the molten steel was set to 0.05% by mass.

In both the first furnace and the second furnace, quicklime and dolomite are used as a slag-making material, and as shown in Tables 2 and 3, the basicity of the slag was set to 1.3 in the first furnace and 1.8 in the second furnace. The molten pig iron temperature of the first furnace is lower than the molten steel temperature of the second furnace, and the slag FeO content is also low, so that the load on the basic refractory is reduced to make it possible to lower the slag basicity of the first furnace.

(Test 2 and Test 3)

Test 2 and Test 3 are comparative examples. The test was conducted using a solid-state direct reduced iron A1 in Test 2 and a solid-state direct reduced iron A2 in Test 3. In both Test 2 and Test 3, all (100% by mass) of the solid-state direct reduced iron was melted in the second furnace and decarburized to obtain a molten steel. Therefore, in Test 2 and Test 3, the first furnace was not used.

In both Test 2 and Test 3, a solid-state direct reduced iron at 500° C. was charged into an electric arc furnace, and the carbon content of the molten steel was set to 0.05% by mass. In addition, quicklime and dolomite were used as a slag-making material, and the basicity of the slag was set to 1.8 as shown in Table 3.

TABLE 2

| First furnace | Test 1 |
|---|---|
| Basicity of slag | 1.3 |
| MgO content of slag (% by mass) | 15 |
| FeO content of slag (% by mass) | 1.0 |
| Carbon content of molten pig iron (% by mass) | 3.0 |
| Temperature of molten iron (° C.) | 1530 |
| Amount of direct reduced iron (500° C.) used (kg/t) | 1098 |
| Amount of quicklime used (kg/t) | 88.3 |
| Amount of dolomite used (kg/t) | 55.4 |
| Amount of carbon used (kg/t) (exterior carburizing) | 28.50 |
| Amount of oxygen used (Nm$^3$/t) | 0 |
| Amount of electric power used (kWh/t) | 591.1 |
| Amount of slag produced (kg/t) | 237 |
| Yield of molten pig iron (%) | 99.8 |

TABLE 3

| Second furnace | Test 1 | Test 2 | Test 3 |
|---|---|---|---|
| Basicity of slag | 1.8 | 1.8 | 1.8 |
| MgO content of slag (% by mass) | 12 | 12 | 12 |
| FeO content of slag (% by mass) | 25.0 | 25.0 | 25.0 |
| Carbon content of molten steel (% by mass) | 0.05 | 0.05 | 0.05 |
| Temperature of molten steel (° C.) | 1630 | 1630 | 1630 |
| Amount of molten pig iron (1300° C.) used | 744.23 | 0 | 0 |
| Amount of direct reduced iron (25° C.) used (kg/t) | 355.1 | 0 | 0 |
| Amount of direct reduced iron (500° C.) used (kg/t) | 0 | 1231 | 1095 |
| Amount of quicklime used (kg/t) | 54.9 | 149.4 | 19.3 |
| Amount of dolomite used (kg/t) | 34 | 87.0 | 18.4 |
| Amount of electric power used (kWh/t) | 203.9 | 542.5 | 461.5 |
| Amount of carbon used (kg/t) (exterior carburizing) | 0 | 0 | 0 |
| Amount of oxygen used (Nm$^3$/t) | 31.7 | 23.2 | 7.6 |
| Amount of slag produced (kg/t) | 169 | 456 | 104 |
| Yield of molten steel (%) | 96.8 | 91.9 | 98.0 |

(Test Results)

Table 2 showed the amount of raw materials and electric power used for production per 1 ton of the molten pig iron, the amount of the slag produced, and the yield of the molten pig iron. Table 3 showed the amount of raw materials and electric power used for production per 1 ton of the molten steel, the amount of the slag produced, and the yield of the molten steel. Table 4 showed the amounts of raw materials and electric power used in the production per 1 ton of the molten steel obtained by combining the step in the first furnace and the step in the second furnace, and the yield of the molten steel. Here, the yield of the molten pig iron is the ratio (% by mass) of the iron content recovered as the molten pig iron to the iron content charged into the first furnace as the solid-state direct reduced iron. Regarding the yield of the molten steel, the ratio (% by mass) of iron recovered as the molten steel to the iron content charged into the second furnace as the solid-state direct reduced iron and the molten pig iron in Test 1 and as the solid-state direct reduced iron in Test 2 and Test 3. Regarding Test 1, the "yield of total molten steel" in Table 4 was calculated as a percentage (% by mass) of the iron content recovered as the molten steel in the second furnace to the total iron content charged into the first furnace and the second furnace as the solid-state direct reduced iron.

(Test 1)

In Test 1, the carbon content of the molten pig iron was as high as 3.0% in the first furnace, so that the FeO content of the slag was as low as 1.0% by mass. As a result, the iron content discharged together with the slag could be suppressed, and the molten pig iron could be produced in a high yield of 99.8%. The amount of the slag generated in the first furnace was 237 kg/t, which was an amount that did not cause any operational problems.

In the second furnace, the carbon content of the molten steel was reduced to 0.05% by mass, so that the FeO content of the slag was as high as 25.0% by mass. However, the amount of the slag produced was 169 kg/t, which was significantly smaller than the amount 456 kg/t of the slag produced in Test 2 in which the entire amount of the same solid-state direct reduced iron A1 was melted in the second furnace, and the amount of iron discharged with the slag could be reduced. In addition, the amount of the slag was an amount that did not cause any operational problems.

The yield of the total molten steel in the entire process in the first furnace and in the second furnace is as high as 96.7%, and even if a low-grade iron ore was used as a raw material for the solid-state direct reduced iron, a molten steel could be obtained in a high yield.

(Test 2)

In Test 2, the carbon content of the molten steel was reduced to 0.05% by mass in the second furnace, so that the FeO content of the slag was as high as 25.0% by mass. In addition, since the first furnace was not used, the total amount of the slag was generated in the second furnace. As a result, a large amount of iron was discharged together with the slag, and the yield of the molten steel was as low as 91.9%.

In addition, the amount of the slag produced was as high as 456 kg/t. The slag produced in such a large amount takes a long time to melt a slag-making material, and it takes a long time to discharge the molten slag from the second furnace, which significantly reduces the productivity of the molten steel. In addition, since a large amount of the slag is held in the furnace and melted, it was necessary to modify the equipment such as raising the furnace shell. Such a large amount of the slag made it difficult to handle the operation.

(Test 3)

In Test 3, a high-grade iron ore was used as a raw material for the solid-state direct reduced iron, so that the amount of the slag produced was as small as 104 kg/t. Therefore, the iron content discharged together with the slag was small, and the yield of the molten steel was 98.0%, which was higher than that of Test 1. In addition, the amount of the slag produced was an amount that did not cause any operational problems.

TABLE 4

|  | Test 1 (whole process) | Test 2 | Test 3 |
|---|---|---|---|
| Amount of total solid-state direct reduced iron used (kg/t) | 1172 | 1231 | 1095 |
| Yield of total molten steel (%) | 96.7 | 91.9 | 98.0 |
| Total electric power used (kWh/t) | 644 | 542.5 | 461.5 |
| Total carbon used (kg/t) (exterior carburizing) | 21.2 | 0 | 0 |
| Total oxygen used (Nm³/t) | 31.7 | 23.2 | 7.6 |
| Total quicklime used (kg/t) | 120.6 | 149.4 | 19.3 |
| Total dolomite used (kg/t) | 75.2 | 87.0 | 18.4 |

SUMMARY

As described above, according to the method for producing a molten steel according to the present invention, it was confirmed that even if a low-grade iron ore was used, a molten steel could be obtained with a high yield equivalent to that when a high-grade iron ore was used.

This application is based on Japanese Patent Application Serial No. 2019-210829 filed in Japan Patent Office on Nov. 21, 2019, the contents of which are hereby incorporated by reference.

To describe the present invention, the invention was described in the foregoing description appropriately and sufficiently using embodiments with reference to specific examples and the like. However, it is to be understood that changes and/or modifications to the foregoing embodiments will readily occur to those skilled in the art. Therefore, unless a change or modification made by those skilled in the art is beyond the scope of the appended claims, such change or modification is to be embraced within the scope of the appended claims.

INDUSTRIAL APPLICABILITY

The present invention has wide industrial applicability in technical fields relating to a method for producing a molten steel.

The invention claimed is:

1. A method for producing a molten steel using a solid-state direct reduced iron as a raw material, the method comprising:
   in a first furnace, melting 40% to 95% by mass of the solid-state direct reduced iron, and separating a molten pig iron having a carbon content of 2.0% to 5.0% by mass and a temperature of 1350 to 1550° C. and a slag having a basicity of 1.0 to 1.4; and
   in a second furnace, melting a remainder of the solid-state direct reduced iron together with the molten pig iron separated in the first furnace to form a molten material, and blowing oxygen onto the molten material to decarburize into a molten steel,
   wherein the solid-state direct reduced iron comprises 3.0% by mass or more of $SiO_2$ and $Al_2O_3$ in total and 1.0% by mass or more of carbon based on a total mass of the solid-state direct reduced iron, a ratio of a metallic iron to a total iron content contained in the solid-state direct reduced iron is 90% by mass or more, and Cx specified by formula (1) is 0.2% by mass or more, $$Cx = [C] - [FeO] \times 12 \div (55.85+16) \div 0.947 \qquad (1)$$

where Cx is an excess carbon content % by mass, [C] is a carbon content of solid-state direct reduced iron % by mass, and [FeO] is a FeO content of solid-state direct reduced iron % by mass.

2. The method according to claim 1, wherein the solid-state direct reduced iron is melted by an arc in the first furnace, and the separating comprises continuously discharging the molten pig iron and the slag respectively from the first furnace.

3. The method according to claim 1, wherein the remainder of the solid-state direct reduced iron is 5% to 60% by mass of the solid-state direct reduced iron.

4. The method according to claim 1, wherein 40% to 90% by mass of the solid-state direct reduced iron is melted in the first furnace.

* * * * *